United States Patent [19]
Altvater

[11] Patent Number: 5,889,771
[45] Date of Patent: Mar. 30, 1999

[54] METHOD FOR TRANSMITTING DATA PACKET BLOCKS AND SUBSCRIBER UNIT THEREFOR

[75] Inventor: Ulrich Altvater, Bad Rappenau, Germany

[73] Assignee: Altvater Air Data Systems GmbH & Co. KG, Germany

[21] Appl. No.: 704,793

[22] PCT Filed: Feb. 10, 1995

[86] PCT No.: PCT/EP95/00474

§ 371 Date: Nov. 13, 1996

§ 102(e) Date: Nov. 13, 1996

[87] PCT Pub. No.: WO95/24806

PCT Pub. Date: Sep. 14, 1995

[30] Foreign Application Priority Data

Mar. 7, 1994 [DE] Germany ................ 44 07 544.8

[51] Int. Cl.$^6$ .................................... H04Q 7/22
[52] U.S. Cl. .................. 370/343; 379/202; 379/267; 455/454
[58] Field of Search ............ 370/329, 330, 370/343, 344; 375/202, 267, 299; 455/454

[56] References Cited

U.S. PATENT DOCUMENTS

| | | | |
|---|---|---|---|
| 3,781,818 | 12/1973 | Pardoe et al. . | |
| 4,352,183 | 9/1982 | Davis et al. . | |
| 4,747,101 | 5/1988 | Akaiwa et al. | 370/477 |
| 5,130,987 | 7/1992 | Flammer | 370/507 |
| 5,193,101 | 3/1993 | McDonald et al. | 455/454 |
| 5,412,658 | 5/1995 | Arnold et al. | 455/454 |
| 5,428,819 | 6/1995 | Wang et al. | 455/454 |
| 5,475,866 | 12/1995 | Ruthenberg | 455/454 |
| 5,548,809 | 8/1996 | Lemson | 455/454 |

FOREIGN PATENT DOCUMENTS

| | | |
|---|---|---|
| 2063901 | 9/1992 | Canada . |
| 0571104A2 | 11/1993 | European Pat. Off. . |

*Primary Examiner*—Melvin Marcelo
*Attorney, Agent, or Firm*—Knobbe, Martens, Olson & Bear, LLP

[57] ABSTRACT

A method for transmitting data packet blocks over multiple frequency channels (16, 24) is described, the frequency channels (16, 24) being at least in part already used in an existing basic network (10) for digital data and/or voice transmission. In a first step a frequency channel (16, 24) currently unoccupied by the basic network (10) is identified, whereupon in a second step a data packet block is transmitted over the identified frequency channel (16, 24). These steps are cyclically repeated, in the manner of a frequency-hopping technique, until all the data packet blocks of a transmission have been transmitted. A corresponding subscriber unit for an auxiliary network (21) with multiple subscriber units (23) is also described, the subscriber unit (23) transmitting the data packet blocks, in accordance with the frequency-hopping technique, in temporally staggered fashion on frequency channels (16, 24) unoccupied at the time by the basic network (10).

26 Claims, 3 Drawing Sheets

METHOD FOR TRANSMITTING DATA PACKET BLOCKS AND SUBSCRIBER UNIT THEREFOR

The present invention relates to a method for transmitting data packet blocks, as well as to a subscriber unit for a packet wireless network with multiple subscriber units for transmitting data packet blocks.

A method and a device of this kind are described in unpublished German patent applications P 43 04 906.0-53 and P 43 04 916.831, which have been submitted in the name of the applicant of the present application.

The method and subscriber unit described operate with a fixed frequency channel over which the packet data blocks are exchanged between subscriber stations and intermediate stations on the one hand, and a central station on the other hand.

With the rising volume of information to be transmitted, there is also an increasing need to operate a plurality such networks in supplementary fashion in geographical regions where other networks already exist. For physical reasons, however, the number of terrestrial wireless channels available is limited, so that efforts are being made at present, on both a national and international level, to make additional frequency channels available.

Moreover, in particular with networks that are designed for real-time transmission, a high signal-to-noise ratio and a certain redundancy must also exist; this requires additional frequency channel capacity. This is particularly important in digital voice networks which operate with the time-division, multiple-access (TDMA) system, since if the individually interleaved data packets cannot be transmitted at the required speed, this causes echo effects in conversations or severe transit time delays, both of which are undesirable.

In order to increase the signal-to-noise ratio, the region to be served is moreover often divided into subregions, in each of which only a portion of all the available frequency channels is used. For example the same frequency channels are not used in two immediately adjacent regions, which reduces crosstalk, for example. This method is referred to as "frequency reuse." The result of this is again that additional frequency channel capacities need to be provided, since the channels assigned to the particular network cannot all be used in a given sub-region.

The maximum channel capacity is furthermore determined by the very different load characteristics of the networks over time; for example, digital telephone networks experience very different loads at different times of the day. In order to make a channel available to the user at any time, however, the network provider must provide a large number of redundant channels.

Examples of such networks, that at present either have already been built up or are in the testing phase, are the GSM (Groupe Special Mobile) wireless network, a European digital wireless network in the 900-MHz range that in Germany is called the D1 or D2 network; or the PCN (Personal Communication Network), which operates in the 1.7/1.8-GHz range and in Germany is called E-plus. These networks cover a wide frequency range for terrestrial wireless communication, so that it is becoming increasingly difficult to provide channel capacity for additional services.

In view of the above it is an object of the present invention to provide the aforesaid method and the aforesaid subscriber unit in such a way that additional transmission capacity is provided in the terrestrial frequency spectrum. Already existing services are to be disturbed as little as possible. In addition, the technical complexity is to be kept within acceptable bounds.

According to the invention, this object is achieved by a method for the transmission of data packet blocks over multiple frequency channels that at least in part are already being used in an existing basic network for digital data and/or voice transmission, the new method comprising the following steps:

1) Identify a frequency channel currently unoccupied by the basic network;
2) Transmit a data packet block over the identified frequency channel; and
3) Cyclically repeat steps 1) and 2), in the manner of a frequency-hopping technique, until all the data packet blocks of a transmission have been transmitted.

According to the invention, this object is further achieved by means of a subscriber unit for an auxiliary network with multiple subscriber units for transmitting packet data blocks over multiple frequency channels that at least in part are already being used by an existing basic network for digital data and/or voice transmission, such that the subscriber unit, in accordance with the frequency-hopping technique, transmits the data packet blocks in temporally staggered fashion on frequency channels unoccupied at the time by the basic network. The object underlying the invention is thus completely solved. Specifically, the inventor of this application has recognized that by using the frequency-hopping technique it is possible to utilize existing channels better without interfering with the particular basic network. As is usual in the frequency-hopping technique, the individual packet data blocks are transmitted in temporally staggered fashion over a variety of frequency channels, the load being distributed over the available channels that are currently unoccupied by the basic network. In other words, a first data packet block is transmitted over a first frequency channel that is currently unoccupied by the basic network, then a second packet data block is transmitted over a second frequency channel that is now currently unoccupied by the basic network, and so forth. In this fashion a frequency channel currently unoccupied by the basic network is used only briefly to transmit a data packet block, the load being distributed over all the frequency channels by the frequency-hopping method. The short additional utilization of a particular frequency channel to transmit a data packet block does not represent an impairment of the basic network, since that frequency channel is after all not being used at that time by the basic network but is provided for redundancy purposes because of the precautions described above regarding fluctuating loads, signal-to-noise ratio requirements, etc., and will perhaps not be used again for several seconds. In this manner, additional data can be transmitted over the existing and otherwise assigned frequency channels.

It is preferred in this context if step 1) comprises the following steps:

1.1) Select one of the multiple frequency channels;
1.2) Check whether the selected frequency channel is occupied by the basic network; and
1.3) Cyclically repeat steps 1.1) and 1.2) until a currently unoccupied frequency channel is identified.

For this purpose, the subscriber unit advantageously comprises a selector circuit for selecting one of the multiple frequency channels, a test circuit to check whether the selected frequency channel is occupied by the basic network, and a sequence controller which cyclically activates the selector circuit and test circuit until a currently unoccupied frequency channel has been identified.

The advantage here is that the method and the new subscriber unit fit themselves adaptively into the basic network. The "holes" resulting from the currently unoccupied frequency channels of the basic network are "filled in" by first "eaves-dropping" to the selected frequency channel before sending a data packet block over that frequency channel.

It is particularly preferred in this context if, in step 1.1), all the multiple frequency channels are selected equally often on a time-averaged basis.

The advantage here is that the load is equally distributed over all frequency channels, which on a time-averaged basis ensures an even higher utilization of the existing frequency channels. The probability of coming upon a "free" channel is also greater if, in particular, the selection is made statistically or pseudo-statistically.

It is furthermore preferred if, in step 1.2), the selected frequency channel is listened in on to check whether the basic network is currently transmitting on that frequency channel.

The advantage here is that any jamming of the basic network can easily be prevented; all that is necessary is to listen in on the selected frequency channel in order to determine its occupancy status.

Alternatively, it is also advantageous if, in step 1.2), an organizational channel of the basic network, which reports all currently occupied and/or all currently free frequency channels, is listened in on.

The further advantage here is that any disruption of the basic network can be even further ruled out. Specifically, when listening in on the selected frequency channel it is possible to fail to hear a weak transmitter, which is not possible with the organizational channel, since the latter is broadcast by the high-power base station of the basic network and has a corresponding transmission strength, since after all it must be received in the entire region by subscribers to the basic network.

In this connection, it is particularly preferred in the case of the new subscriber unit if the test circuit comprises a receiver which receives on the selected frequency channel or on the organizational channel.

This feature is especially advantageous in terms of circuit engineering, since the receiver present in any event in the subscriber unit can additionally be used to interrogate the occupancy status of the selected frequency channel.

It is further preferred if the transmission occurs in an auxiliary network between multiple subscriber units each of which has its own address that is known to other subscriber units, and if in step 1.1), the frequency channel is selected on the basis of a system time common to all subscriber units and of the address of the subscriber unit for which the transmission is intended, so that at each subscriber unit, the frequency channel over which data packet blocks intended for that subscriber unit are being transmitted at a given system time is known.

In this connection, it is preferable for a subscriber unit if it has its own address in the auxiliary network and comprises a system clock, such that the selector circuit calculates from the current system time common to all subscriber units and the address of the subscriber unit for which the transmission is intended, the selected frequency channel.

The advantage here is that multiple transmissions can be performed simultaneously over the multiple frequency channels, the synchronization between the various transmitters and receivers in the auxiliary network taking place by means of the addresses of the receivers and the universally known system time. This makes possible even greater utilization of the existing frequency channels. Specifically, the inventor has recognized that existing basic networks, such as for example the GSM or PCN networks already mentioned, utilize their frequency channels at a rate of only 50–60%, so that by means of the new method and new subscriber units, 50 or more additional connections between subscriber units are possible in an auxiliary network over the frequency channels assigned to the basic network, without even being noticed by the basic network.

It is further preferred if the selected frequency channel is calculated with the aid of a pseudo-random number generator from the address of the subscriber unit and the system time.

This has the advantage not only that uniform distribution of the load over all the frequency channels is achieved, but also that individual frequency channels are quasi-randomly interrogated as to whether they are currently occupied by the basic network; the overall result is that a currently free frequency channel is found more quickly than if this were performed in stochastically iterative fashion.

It is additionally advantageous if the system time is synchronized by a central station of the auxiliary network.

Although it would be possible to use, instead of an independent system time, for example the time signal broadcast by the German Physikalisch-Technische Bundesanstalt, this would mean greater technical complexity. Each subscriber unit could also be equipped with its own independent clock, but this would have the disadvantage that timekeeping differences between the clocks would cause data packet blocks to get "lost" in the auxiliary network because the transmitter and receiver were respectively transmitting and receiving on different frequency channels because of the time offset. These timekeeping differences could be partially taken into account by leaving a sufficient time interval between sending out individual data packet blocks, so that all the subscriber units have switched over to their respective new receiving channel. But the result of this, on the other hand, would be that the traffic density on the auxiliary network could not be particularly great. Synchronization by the central station now makes possible a much closer spacing of data packet blocks, which further increases the utilization of the frequency channels.

In this connection, it should also be mentioned that each subscriber unit calculates, from its own address and the current system time, the frequency channel over which transmissions are to be expected. In step with the system time cycle, each subscriber unit switches to a new frequency channel and waits for incoming transmissions. If that frequency channel should currently be in use by the basic network, the receiving network recognizes this from the different structures of the arriving data packet blocks, and ignores them until switching to a new frequency channel.

It is advantageous in this regard if the system time repeats at a time interval that is divided into fixed time slots, and if steps 1) and 2) are performed synchronously with the time slots, step 2) as a rule requiring less than one time slot.

The system time can, for example, be repeated at 10-second time intervals, the time slots each being 10 ms long. Cyclical repetition of the system time simplifies, in particular, the process (discussed in detail above) of calculating from the respective address of the subscriber unit and the current system time the next frequency channel to be selected. The narrowness of the time slots has the advantage that the basic network itself is only slightly degraded if, for example, a data packet block is inadvertently sent out over a frequency channel that is currently occupied by the basic network. A data packet block that is 10 ms long is, for example, audible on a voice channel only as a short "beep" that is lost in the noise that is usually present. Because of the method chosen for selecting the frequency channel, the number of time slots into which the system time is divided must be equal to or greater than the number of subscriber units in the auxiliary network.

It is preferable here if the number of time slots in the time interval is greater than the number of multiple frequency channels, preferably an integral multiple thereof.

The advantage here is that uniform distribution of the load among the frequency channels is ensured in this simple manner. Thus for each subscriber unit, each available frequency channel is selected for transmission and/or reception at least once during each pass through the system time.

In general terms it is preferred if the multiple frequency channels are among the transmitting channels of a base station of the basic network.

This has the same advantage as listening in on the organizational channel as already mentioned, since the transmitting channels of the base station are stronger than the transmitting channels of the individual subscribers, which can more easily be "missed" than the base station. This feature thus ensures that data packet blocks are transmitted only on currently unoccupied frequency channels.

It is further preferred, when a transmitting channel and (in the case of a two-way connection) an associated receiving channel of a base station of the basic network have a fixed frequency spacing, if in step 1) a transmitting channel of the base station currently unoccupied by the basic network is identified, and if in step 2), after transmission of a data packet over the identified transmitting channel, a further data packet is transmitted over the receiving channel associated with the transmitting channel before step 3) is performed.

This advantageously makes use of the fact that, for example in the E-plus network, the base station always transmits in an uplink band, in this case for example 1855–1865 MHz, while the subscriber points transmit in a downlink band, in this case for example 1760–1770 MHz, the transmitting channel and receiving channel always exhibiting, in the case of a two-way connection, a fixed frequency spacing, for example in this case 95 MHz. In other words, if the transmitting channel of the base station is unoccupied, the receiving channel of the base station, located 95 MHz lower, is also unoccupied. It is thus possible, with a single interrogation in the uplink band of the base station, to identify two currently unoccupied frequency channels on which data packets can be sent in succession, i.e. in successive time slots. The available channel capacity is doubled in this manner, while a currently unoccupied frequency channel needs to be identified only once in step 1).

This has the further advantage that only the less easily "missed" uplink band of the base station is listened in on, while both the uplink band and the downlink band of the base station can nevertheless be used in the auxiliary network without inadvertently transmitting on a frequency channel that is currently occupied by the basic network. Thus not only is immunity to interference increased, but the number of available frequency channels is also doubled.

Further advantages are evident from the description and the attached drawings.

It is understood that the features mentioned above and those yet to be explained below can be used not only in the respective combinations indicated, but also in other combinations or alone without departing from the scope of the present invention.

The invention is illustrated in the drawings and will be explained in more detail in the description which follows. In the drawings.

Figure 1:
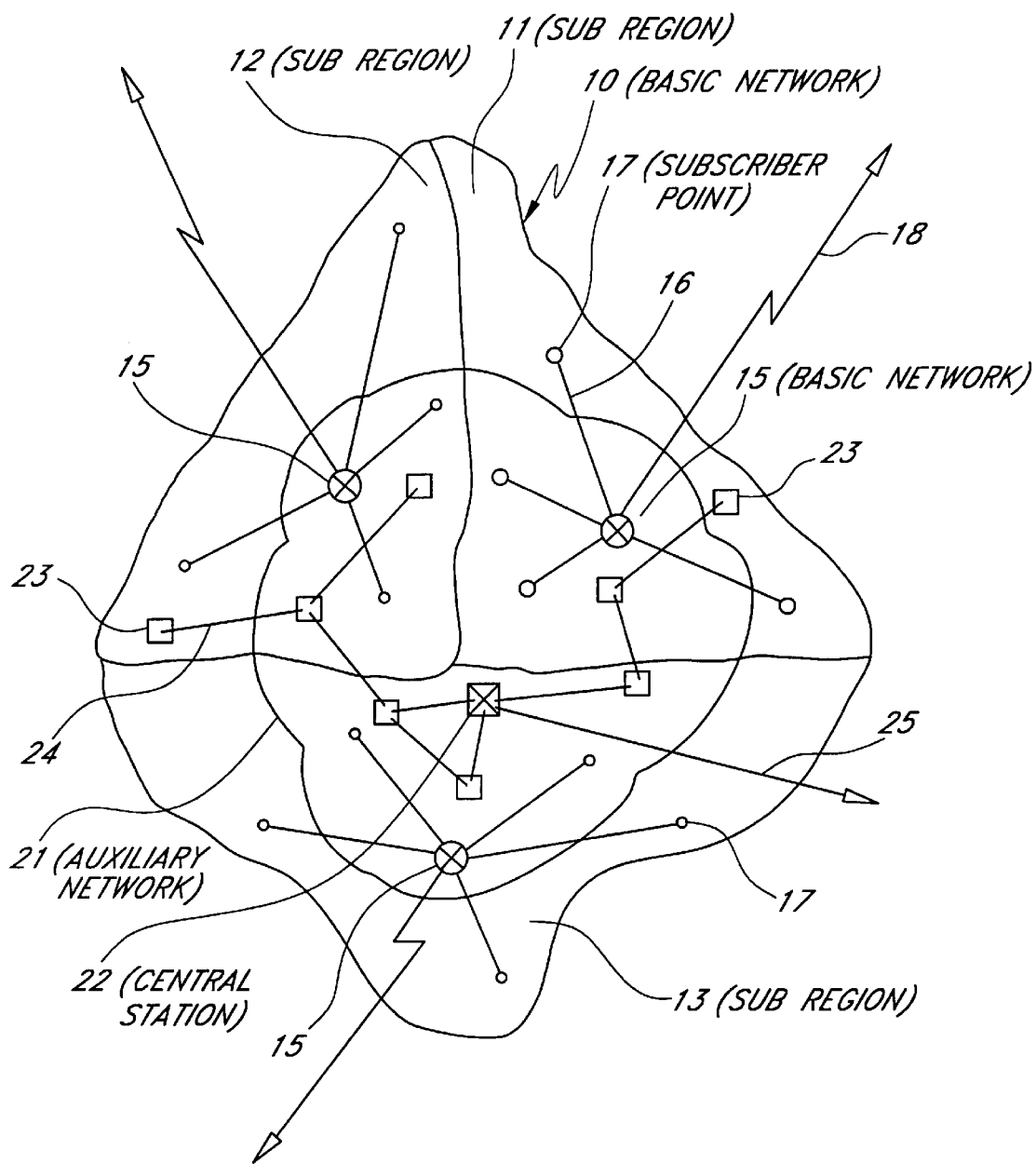
FIG. 1 shows, in a simplified schematic sketch, a basic network with three subregions as well as an auxiliary network superimposed on that basic network.

In FIG. 1, the number 10 indicates a basic network such as, for example, the GSM or PCN network, which is divided into three subregions 11, 12, 13. In each subregion 10, 11, 12 the basic network 10 has a base station 15 that is connected to subscriber points 17 by wireless channels 16. Each base station, connected in star fashion to subscriber points 17, furthermore has an external connection 18 by which base station 15 connects its subscriber points 17 to subscriber points in other networks.

In order to prevent crosstalk, separate frequency channels are assigned to the various subregions 11, 12, 13; for example subregion 11 has frequency channels $f_f-f_k$, subregion 12 frequency channels $f_l-f_m$, and subregion 13 frequency channels $f_p-f_q$.

Superimposed on the basic network is a mesh-type auxiliary network 21, which has a central station 22 as well as subscriber units 23 that are connected to one another and to central station 22. This connection of the subscriber units to one another and to the central station takes place over wireless channels 24. Central station 22 is also connected via an external connection 25 to further networks.

For differentiation in FIG. 1, base station 15 and subscriber points 16 of the basic network are marked by circles, and central station 22 and subscriber units 23 of the auxiliary network are marked by rectangles. It is apparent that the basic network and auxiliary network 21 at least partially overlap spatially. Some of subscriber points 16 and/or subscriber units 23 can be mobile users. Network configuration and data packet wireless communication over auxiliary network 21 are described in detail in the aforementioned patent applications P 43 04 916 and P 43 04 906. The contents of these patent applications are hereby expressly made also the subject of the present application, so that further discussion about network configuration is superfluous.

While in basic network 10 the frequency channels are divided among the individual subregions 11, 12, 13, auxiliary network 21 uses all the frequency channels $f_f-f_q$ associated with basic network 10. By using a frequency-hopping technique that will now be explained in more detail in conjunction with FIG. 2, provision is made for the packet data wireless communications of auxiliary network 21 to use only those frequency channels $f_1-f_q$ that are currently unoccupied by basic network 10.

Figure 2:
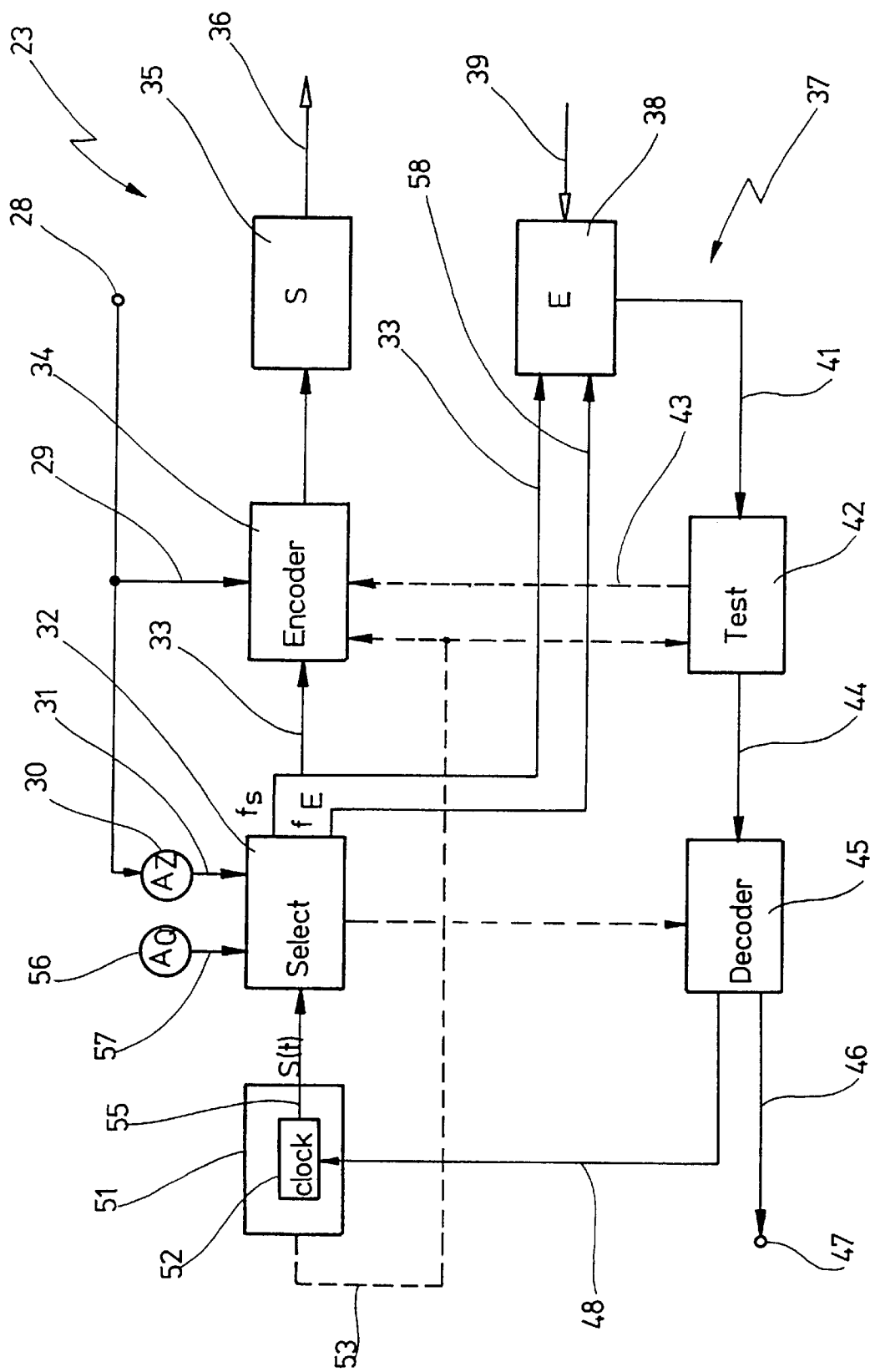
FIG. 2 shows a block diagram of a subscriber unit used in an auxiliary network from FIG. 1.

FIG. 2 shows in more detail, in the form of a simplified block diagram, a subscriber unit 23 of auxiliary network 21. The data to be transmitted are entered into subscriber unit 23 at a terminal 28. These data are divided into transmission data 29 as well as a target address 30, which passes via an address line 31 into a selector circuit 32. In a manner yet to be described, selector circuit 32 selects a frequency channel of basic network 10 over which the transmission data are to be sent out. This frequency channel is conveyed, via a transmission frequency line 33, to an encoder circuit 34 which transforms the transmission data waiting on line 29 into data packet blocks, and impresses them onto the selected frequency channel. These data packet blocks then pass to a transmitter 35 which sends them out via an antenna terminal 36, provided the selected frequency channel is currently unoccupied by basic network 10.

This check as to possible occupation of the selected frequency channel occurs in a test circuit 37 which comprises a receiver 38 that is also connected to transmission frequency line 33. Receiver 38 receives via its antenna terminal 39 on the selected frequency channel, and forwards the received information via a receiving line 41 to a test circuit 42. Test circuit 42 analyzes the received information and reports on an "occupied" line 43, which is connected to encoder circuit 34, if the selected frequency channel is occupied by basic network 10.

If this is the case, the current data packet block is not sent out; instead, in a manner yet to be described, a new frequency channel is selected, for which a check is then made as to whether it is currently occupied by basic network 10.

If the transmitting channel and, in the case of a two-way connection, the associated receiving channel of base station 15 are at a fixed frequency spacing, a free transmitting channel of base station 15 also means a free receiving channel. Since the transmitting channel has a higher transmission power than the receiving channel, which may be due to a low power subscriber point 17, only the transmitting channel is listened in on, and if the transmitting channel is free, transmission occurs first on it and then, in the next step, on the associated receiving channel, which must necessarily be free. This saves a checking step and/or eliminates a jamming of the basic network.

Rather than on the selected frequency channel, receiver 38 can also receive on the organizational channel of a base station 15 of basic network 10, over which basic network 10 continuously announces all occupied and/or free frequency channels. Test circuit 42 can also process this information in order to generate an "occupied" signal.

When, on the other hand, receiver 38 has received data packet blocks intended for the current subscriber unit 23, test circuit 42 forwards them via a line 44 to a decoder circuit 45. This decoder circuit 45 decodes the received data packet blocks and forwards received data 47 on its output line 46. On a second output line 48, decoder circuit 45 provides signals to a sequence controller 51 which comprises a system clock 52. The signals transferred on output line 48 are system time data which subscriber unit 23 receives from central station 22. Central station 22 sends a time datum of this kind for the first time immediately after activation of auxiliary network 21, thus temporally synchronizing all subscriber units 23 with one another and with central station 22. To ensure that the accuracy requirements for system clocks 52 are not excessive, at certain time intervals central station 22 retransmits these time data, which are used for further synchronization between subscriber units 23.

Overall sequence control for subscriber unit 23 is managed via a synchronization line 53 that connects sequence controller 51 to selector circuit 32, encoder circuit 34, test circuit 42, and decoder circuit 45. Sequence controller 51 ensures, by means of synchronization line 53, that frequency channels are selected and checked in specific time slots, only one frequency channel being selected in each time slot, as is yet to be described.

System clock 52 is connected at its output 55 to selector circuit 32, and delivers to it the current system time S(t). Selector circuit 32 is furthermore informed of its own address $A_Q$ in auxiliary network 21. This "source address" 56 passes via an address line 57 into selector circuit 32, while target address $A_Z$ passes via address line 31 into selector circuit 32.

From the system time S(t) and target address $A_Z$, selector circuit 32 calculates, in a manner yet to be described, the frequency channel $f_S$ over which the next data packet block is to be transmitted. Selector circuit 32 also calculates, from the system time S(t) and source address $A_Q$, the channel frequency $f_E$ on which transmissions for subscriber unit 23 itself may be expected. This frequency channel $f_E$ is reported via a receiving frequency line 58 to receiver 38, which in this manner is, so to speak, doubly utilized: in the first place it is used to receive data packet blocks intended for subscriber unit 23 on frequency channel $f_E$, while on the other hand it is also used to listen in on channel frequency $f_S$ on which the actual transmitter 35 is to send out data packet blocks.

The system time S(t) is divided into x time slots Δy, such that:

$$S(t) = n \times \Delta y, \text{ where } n = 1 \ldots x$$

For a total system time of 10 seconds, each time slot Δy is, for example, 10 ms, so that the number of time slots x=1000. Each individual time slot Δy is so short that even if an occupied frequency channel is "missed," the disruption in basic network 10 can be ignored. A time slot Δy is, however, long enough that as a rule one data packet block can be transmitted in one time slot.

The number x of time slots Δy within the entire system time x times Δy is selected to be such that the load over time on the frequency channels is uniformly distributed. In this context, x is selected so that during one "pass" through system time S(t), each subscriber unit can use each available frequency channel at least once for transmitting and/or receiving. If x is much greater than the number of available frequency channels, the selection of frequency channels in selector circuit 32 can take place pseudo-statistically, which has the advantage that on average, a greater number of hits on unoccupied frequency channels is to be expected than if the available frequency channels were tried in sequence in purely deterministic fashion.

Since the system time S(t) repeats cyclically, x must also be greater than the number of subscriber units 23 in auxiliary network 21, since otherwise some subscriber units 23 would never have a frequency channel assigned to them for reception.

It remains to note that the selection of a frequency channel occurs in all subscriber units 23 once per time slot Δy, so that each subscriber unit 23 is ready at any time to receive on the frequency assigned to it in the current time slot. Subscriber units 23 that currently wish to send out data packet blocks to a target address $A_Z$ calculate, from that target address $A_Z$ and from the current system time S(t), the frequency channel onto which the relevant subscriber unit 23, for which the transmission is intended, has just switched.

Figure 3:
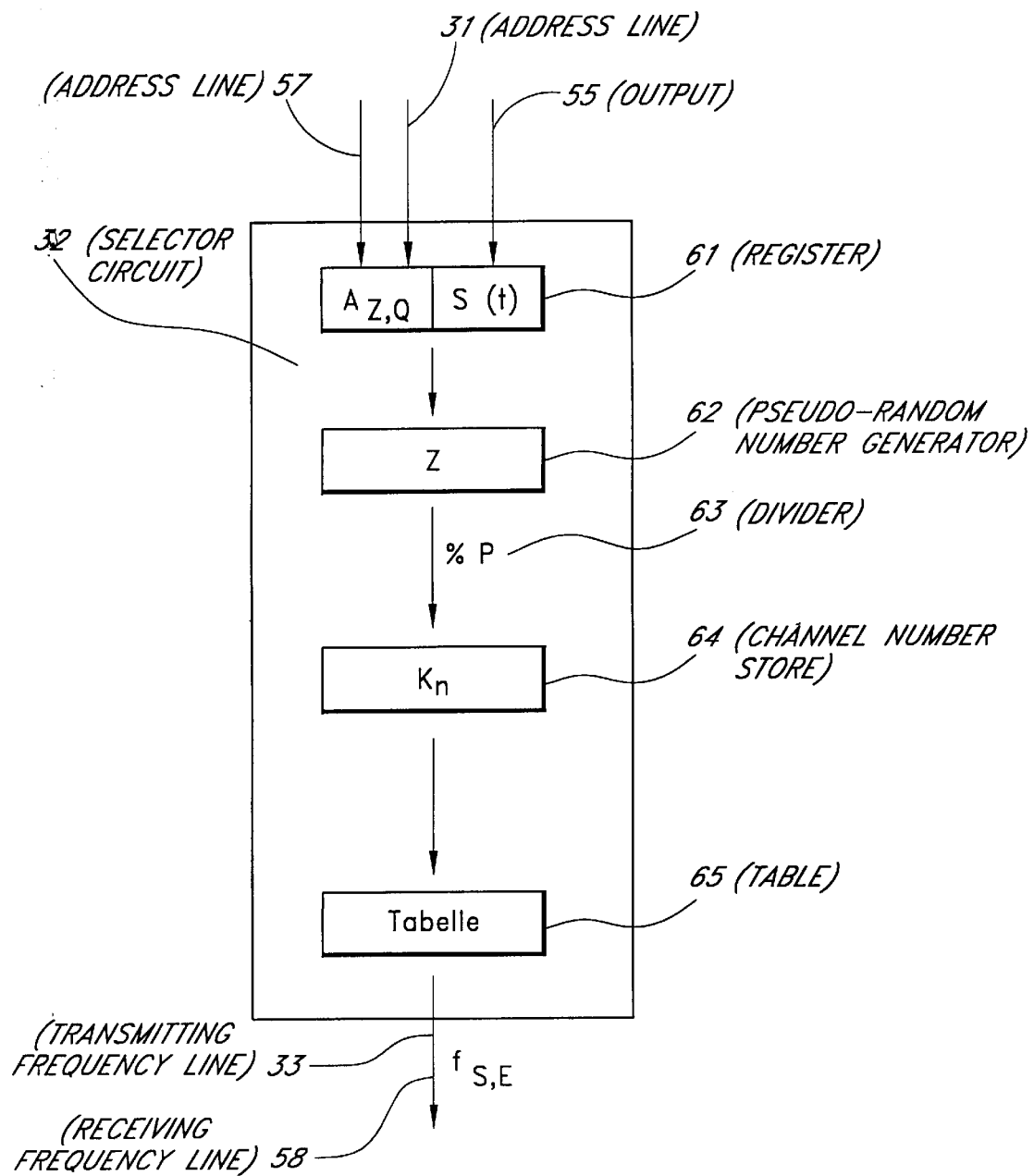
FIG. 3 shows a simplified diagram for the selection of a frequency channel on the basis of the address of the subscriber unit from FIG. 2 and the system time.

A description of how this selection of frequency channels occurs will now be given with reference to FIG. 3, in which selector circuit 32 is depicted in a simplified block diagram.

Selector circuit 32 has an input register 61 in which one of the addresses $A_Z$ or $A_Q$ is loaded via address lines 31 and 57. The system time S(t) is also loaded into this register via line 55. Let it be assumed by way of example that a target address $A_Z$=45 has been loaded, and that the current system time S(t=3s)=300 Δy. In this case the content of register 61=45300.

From this number, a pseudo-random number generator 62 defines a pseudo-random number Z. Since the system time S(t) repeats at intervals of time, pseudo-random number Z is also deterministic to the extent that it repeats within the defined intervals.

This pseudo-random number Z is now divided, at 63, by a prime number P which is the first prime number that is less than the number of frequency channels in basic network 10. The remainder of this division operation is the channel number $K_n$ that was calculated at system time $S(t=n)$ for target address $A_z$. This channel number is stored at 64. Based on this channel number $K_n$, the current frequency of the frequency channel is determined from a table 65, and is output via transmitting frequency line 33 and receiving frequency line 58.

I claim:

1. A method of transmitting data packet blocks over multiple frequency channels that at least in part are already being used in an existing basic network for digital data and/or voice transmission, the transmission occurring in an auxiliary network between multiple subscriber units each of which has its own address that is known to other subscriber units, comprising the steps:

1) identify a frequency channel currently unoccupied by the basic network, based on signals that are received and suitably analyzed by any one subscriber unit in the auxiliary network;

2) transmit a data packet block over the identified frequency channel; and 3) cyclically repeat steps 1) and 2), in the manner of a frequency-hopping technique, until all the data packets blocks of a transmission have been transmitted.

2. The method according to claim 1, wherein step 1) comprises the following steps:

1.1) select one of the multiple frequency channels;

1.2) check whether the selected frequency channel is occupied by the basic network; and 1.3) cyclically repeat steps 1.1) and 1.2) until a currently unoccupied frequency channel is identified.

3. The method according to claim 2, wherein in step 1.1), all the multiple frequency channels are selected equally often on a time-averaged basis.

4. The method according to claim 2, wherein in step 1.2), the selected frequency channel is monitored to check whether the basic network is currently transmitting on that frequency channel.

5. The method according to claim 2, wherein in step 1.1), the one frequency channel is selected on the basis of a system time common to all subscriber units and of the address of the subscriber unit for which the transmission is intended, so that at each subscriber unit, the frequency channel over which data packet blocks intended for that subscriber unit are being transmitted at a given system time is known.

6. The method according to claim 5, wherein the frequency channel to be selected is calculated with the aid of a pseudo-random number generator from the address of the subscriber unit and the system time.

7. The method according to claim 5, wherein the system time is synchronized by a central station of the auxiliary network.

8. The method according to claim 1, wherein a system time repeats at a time interval that is divided into fixed time slots; and wherein steps 1) and 2) are performed synchronously with the time slots, step 2) as a rule requiring less than one time slot.

9. The method according to claim 8, wherein the number of time slots in the time interval is greater than the number of multiple frequency channels.

10. The method according to claim 1, wherein the multiple frequency channels are comprised by the transmitting channels of a base station of the basic network.

11. The method according to claim 1, in which a transmitting channel and an associated receiving channel of a base station of the basic network have a fixed frequency spacing, wherein in step 1) a transmitting channel of the base station currently unoccupied by the basic network is identified; and wherein in step 2), after transmission of a data packet over the identified transmitting channel, a further data packet is transmitted over the receiving channel of the base station associated with the transmitting channel before step 3) is performed.

12. The method according to claim 9, wherein the number of time slots in the time interval is an integral multiple of the number of multiple frequency channels.

13. A method of transmitting data packet blocks over multiple frequency channels that at least in part are already being used in an existing basic network for digital data and/or voice transmission, the transmission occurring in an auxiliary network between multiple subscriber units each of which has its own address that is known to other subscriber units, comprising the following steps:

1) identify a frequency channel currently unoccupied by the basic network, based on information sent out by the basic network itself and suitably analyzed by any one subscriber unit in the auxiliary network;

2) transmit a data packet block over the identified frequency channel; and 3) cyclically repeat steps 1) and 2), in the manner of a frequency-hopping technique, until all the data packet blocks of a transmission have been transmitted.

14. The method according to claim 13, wherein step 1) comprises the following steps:

1.1) select one of the multiple frequency channels;

1.2) check whether the selected frequency channel is occupied by the basic network; and 1.3) cyclically repeat steps 1.1) and 1.2) until a currently unoccupied frequency channel is identified.

15. The method according to claim 14, wherein in step 1.1), the frequency channel is selected on the basis of a system time common to all subscriber units and of the address of the subscriber unit for which the transmission is intended, so that at each subscriber unit, the frequency channel over which data packet blocks intended for that subscriber unit are being transmitted at a given system time is known.

16. The method according to claim 14, wherein in step 1.2), an organization channel of the basic network, which reports all currently occupied and/or all currently free frequency channels, is monitored.

17. A subscriber unit for an auxiliary network with multiple subscriber units for transmitting packet data blocks over multiple frequency channels that at least in part are already being used by an existing basic network for digital data and/or voice transmission, wherein the subscriber unit, in accordance with the frequency-hopping technique, transmits the data packet blocks in temporally staggered fashion on frequency channels unoccupied at the time by the basic network, and has a test circuit which checks, on the basis of signals received by the subscriber unit, whether the selected frequency channel is occupied by the basic network.

18. The subscriber unit according to claim 17, wherein the subscriber unit comprises a selector circuit for selecting one of the multiple frequency channels, a sequence controller being provided which cyclically activates the selector circuit and test circuit until a currently unoccupied frequency channel has been identified.

19. The subscriber unit according to claim 18, wherein the test circuit comprises a receiver which receives on the selected frequency channel.

20. The subscriber unit according to claim 18, wherein the subscriber unit has its own address in the auxiliary network and comprises a system clock, such that the selector circuit calculates, from the current system time common to all subscriber units and the address of the subscriber unit to which the data packet blocks are to be transmitted, the frequency channel to be selected.

21. The subscriber unit according to claim 19, wherein the subscriber unit has its own address in the auxiliary network and comprises a system clock, such that the selector circuit calculates, from the current system time common to all subscriber units and the address of the subscriber unit to which the data packet blocks are to be transmitted, the frequency channel to be selected.

22. A subscriber unit for an auxiliary network with multiple subscriber units for transmitting packet data blocks over multiple frequency channels that at least in part are already being used by an existing basic network for digital data and/or voice transmission, wherein the subscriber unit, in accordance with the frequency-hopping technique, transmits the data packet blocks in temporally staggered fashion on frequency channels unoccupied at the time by the basic network, and has a test circuit which checks, on the basis of information sent out by the basic network itself and received by the subscriber unit, whether the selected frequency channel is occupied by the basic network.

23. The subscriber unit according to claim 22, wherein the subscriber unit comprises a selector circuit for selecting one of the multiple frequency channels, a sequence controller being provided which cyclically activates the selector circuit and test circuit until a currently unoccupied frequency channel has been identified.

24. The subscriber unit according to claim 23, wherein the test circuit comprises a receiver which receives on an organizational channel of the basic network which reports all currently occupied and/or all currently free frequency channels.

25. The subscriber unit according to claim 23, wherein the subscriber unit has its own address in the auxiliary network and comprises a system clock, such that the selector circuit calculates, from the current system time common to all subscriber units and the address of the subscriber unit to which the data packet blocks are to be transmitted, the frequency channel to be selected.

26. The subscriber unit according to claim 24, wherein the subscriber unit has its own address in the auxiliary network and comprises a system clock, such that the selector circuit calculates, from the current system time common to all subscriber units and the address of the subscriber unit to which the data packet blocks are to be transmitted, the frequency channel to be selected.

* * * * *